United States Patent Office.

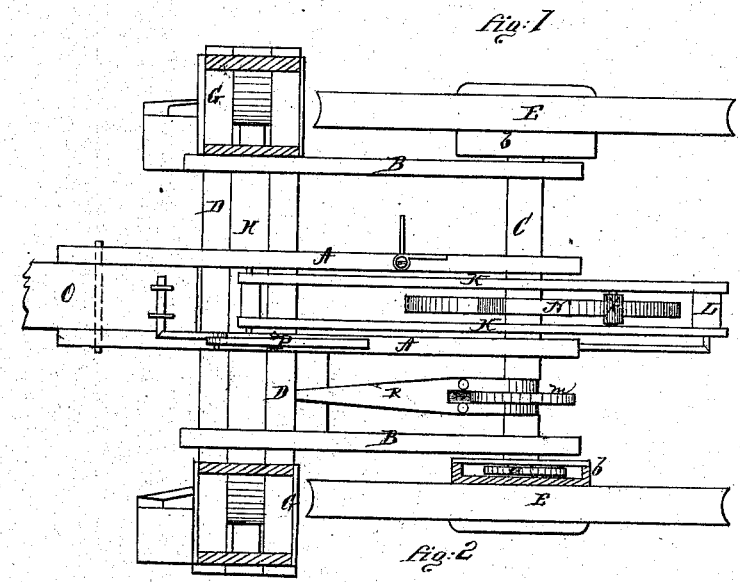

FLOYD OGDEN, OF FISHERVILLE, KENTUCKY, ASSIGNOR TO HIMSELF AND J. T. ROSE, OF UTICA, INDIANA.

Letters Patent No. 108,044, dated October 4, 1870.

IMPROVEMENT IN CORN-PLANTERS AND MARKERS.

The Schedule referred to in these Letters Patent and making part of the same.

*To all whom it may concern:*

Be it known that I, FLOYD OGDEN, of Fisherville, in the county of Jefferson and in the State of Kentucky, have invented certain new and useful Improvements in Corn-Planter and Marker; and do hereby declare that the following is a full, clear, and exact description thereof, reference being had to the accompanying drawing and to the letters of reference marked thereon making a part of this specification.

The nature of my invention consists in the construction and arrangement of a corn-planter and marker, as will be hereinafter fully set forth.

In order to enable others skilled in the art to which my invention appertains to make and use the same, I will now proceed to describe its construction and operation, referring to the annexed drawing, in which—

Figure 1 is a plan view of my machine, and

Figure 2 is a side elevation of the same, one wheel being removed.

Figure 3 is an inside view view of the hub of the wheel.

A A represent two center beams, and

B B, two side beams, through the rear ends of which the axle C passes, the said beams being connected by means of two cross-bars, D D, on their under side, a suitable distance in front of the axle.

On each end of the axle C, outside of the side-beams B, is secured a toothed wheel, *a*, which is in-inclosed in a casing, *b*, formed in the hub of the wheel E.

In the casing *b* is a pawl, *d*, pressed inward to the wheel *a*, by means of the spring *e*, and so arranged that, when the machine moves forward, the pawl will catch in the wheel *a* and turn the axle; but, when moving backward, the pawl will slide over the teeth and not turn the axle.

On the ends of the cross-bars D D, and immediately in front of the wheels E E, are placed the hoppers or corn-boxes G G, under the bottoms of which the slide H moves from side to side, the cross-bars D D acting as guides between which said slide may move.

Under the hoppers G G, or, rather, on the under sides of the bars D D, below the hoppers, are secured the conductors I I, through which the corn passes into the ground.

To the lower ends of the conductors I are attached the runners J, which extend forward and upward, as shown in fig. 2.

As the slide H moves from side to side it carries a grain of corn from the opening in the bottom of the hopper to the conductor I, from whence it falls down into the ground.

The slide H is operated at suitable invervals by the following means:

Between the two center beams A A, above the slide H, are pivoted two bars, K K, which extend backward over and beyond the axle, and have a foot, L, firmly secured between their rear ends.

From this foot a rod, *f*, connects with an arm upon a vertical shaft, M, which is provided with another arm, *h*, projecting into and through a staple, *i*, on the under side of the slide H.

It will readily be seen that, if the bars K K were raised to a certain height, the rod *f* would turn the shaft M on its pivots, and this shaft, through its arm *h*, move the slide H to one side. Then, if the bars K K are let down again, the slide H will move to the other side.

This motion of the bars K K is accomplished by means of a three-cammed wheel, N, attached to the axle C, between the two center beams A A, which cams, as the axle revolves, bear against a roller, *k*, placed between the bars K, in rear of the axle, and in front of the foot L.

As the curved side of the cam bears against the roller *k*, the bars K, with the foot L, are raised, moving the slide H, as above mentioned, and as soon as the roller *k* comes to the square end of the cam, the bars K drop suddenly down, moving the slide back again, and, at the same time, by means of the foot L, marking the ground between the hills.

The tongue O is pivoted between the front ends of the center beams A A and a lever, P, pivoted on one of the bars A, operates on the rear end of the tongue, so as to raise or lower the front end of the machine at will.

On the axle C, at a suitable point, is secured a toothed wheel, *m*, and also a forked lever, R, with spring pawl *n*, working in said toothed wheel, by means of which the operator may turn the axle so as to set the dropping mechanism, and cause it to drop at the desired point.

In moving to or from the field, and in turning, the bars K K are raised up, and an arm, *p*, inserted underneath to hold them up, so that the cam-wheel N will not touch the roller *k*, and hence will not operate the dropper.

Having thus fully described my invention,

What I claim as new, and desire to secure by Letters Patent, is—

1. The cam-wheel N, secured to the axle C, and acting, in combination with the roller *k*, bars K K, and foot L, for the double purpose of operating the planting mechanism and marking the ground, substantially as herein set forth.

2. The combination of the foot L, rod *f*, shaft M, and arm *h*, constructed and arranged as described, for the purpose of operating the slide H, substantially as herein set forth.

3. The combination of the frame A B D, shaft C, wheel E, hoppers G, slide H, conductors I, runners J, bars K, foot L, shaft M, cams N, tongue O, and levers P R, all constructed and arranged to operate substantially as and for the purposes herein set forth.

In testimony that I claim the foregoing, I have hereunto set my hand this 12th day of September, 1870.

FLOYD OGDEN.

Witnesses:
  A. N. MARR,
  J. E. HUTCHINSON.